(12) United States Patent
LeFevre et al.

(10) Patent No.: US 7,177,906 B2
(45) Date of Patent: Feb. 13, 2007

(54) SOFTWARE APPLICATION LAUNCHING METHOD AND APPARATUS

(75) Inventors: John S. LeFevre, Seattle, WA (US); Alec Kwok, Newcastle, WA (US)

(73) Assignee: PalmSource, Inc., Sunnyvale, CA (US)

(*) Notice: Subject to any disclaimer, the term of this patent is extended or adjusted under 35 U.S.C. 154(b) by 708 days.

(21) Appl. No.: 09/871,112

(22) Filed: May 31, 2001

(65) Prior Publication Data

US 2002/0184395 A1    Dec. 5, 2002

(51) Int. Cl.
*G06F 15/16* (2006.01)

(52) U.S. Cl. ............... 709/206; 709/203; 709/217; 709/220; 709/223; 345/158; 345/835; 345/864

(58) Field of Classification Search ........... 709/206, 709/203, 217, 223, 220, 208; 455/557, 426.1, 455/566; 345/864, 158, 835; 713/100
See application file for complete search history.

(56) References Cited

U.S. PATENT DOCUMENTS

| | | | |
|---|---|---|---|
| 5,692,129 A | 11/1997 | Sonderegger et al. ... | 707/103 R |
| 5,748,890 A | 5/1998 | Goldberg et al. .......... | 713/202 |
| 5,859,978 A | 1/1999 | Sonderegger et al. ....... | 709/226 |
| 6,047,312 A | 4/2000 | Brooks et al. .............. | 709/203 |
| 6,175,363 B1 | 1/2001 | Williams et al. ............ | 345/746 |
| 6,216,157 B1* | 4/2001 | Vishwanath et al. ........ | 709/208 |
| 6,247,052 B1 | 6/2001 | Huang et al. ............... | 709/224 |
| 6,271,844 B1 | 8/2001 | Selles ......................... | 345/853 |
| 6,362,840 B1* | 3/2002 | Burg et al. ................. | 345/835 |
| 6,463,304 B2* | 10/2002 | Smethers .................... | 455/566 |
| 6,466,198 B1* | 10/2002 | Feinstein .................... | 345/158 |
| 6,539,476 B1* | 3/2003 | Marianetti et al. .......... | 713/100 |
| 6,678,535 B1* | 1/2004 | Narayanaswami .......... | 455/557 |
| 2001/0013064 A1 | 8/2001 | Cox et al. ................... | 709/220 |

* cited by examiner

Primary Examiner—Yves Dalencourt
(74) Attorney, Agent, or Firm—Berry & Associates P.C.

(57) ABSTRACT

A handheld computer includes a housing and a display supported by the housing and configured to display images representative of computer program applications. The handheld computer also includes a memory and a microprocessor coupled to the memory and the display and configured to run applications stored in the memory. The handheld computer also includes a software application that is stored in the memory. The handheld computer further includes a launching application stored in the memory. This launching application has an image on the display representative of the software application and the launching application carries out computer program steps to modify the launching environment prior to running the software application such that the software application runs properly on the handheld computer, the software application not originally designed to run on the handheld computer.

11 Claims, 3 Drawing Sheets

SOFTWARE APPLICATION LAUNCHING METHOD AND APPARATUS

BACKGROUND

Handheld computing devices, "palmtops," "palmhelds," personal digital assistants (PDAs), or handheld computers typically weigh less than a pound and fit in a pocket. These handhelds generally provide some combination of personal information management, database functions, word processing, and spreadsheets as well as voice memo recording, wireless e-mail, and wireless telephony functions. Because of the small size and portability of handhelds, strict adherence to hardware constraints such as memory and processor size must be maintained. Additionally because of the small size of handheld computers, they are not easily reconfigured for use with various software applications.

Accordingly, there is a need for a software application that is seamless to the user and is capable of modifying parameters of the handheld computer and launching another software application that could otherwise not be used without the parameter modifications. Further there is a need for a first software application for a handheld computer having a display icon such that when the display icon is selected the first software application is configured to request loading of a second software application and after the second software application is loaded, future selection of the display icon launches the second software application. Further still there is a need for a first software application that modifies hardware and/or software settings to enable the use of a second software application with the hardware running the first software application. Yet further still there is a need for a first software application that provides the necessary functionality for a second application to run on a handheld computer for which the second application was not designed.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to a handheld computer. The handheld computer includes a housing, a display supported by the housing and configured to display images representative of computer program applications, a memory, and a microprocessor coupled to the memory and the display and configured to run applications stored in the memory. The handheld computer also includes a software application stored in the memory, and a launching application stored in the memory and having an image on the display representative of the software application and the launching application carrying out computer program steps to modify the launching environment prior to running the software application such that the software application runs properly on the handheld computer, the software application not originally designed to run on the handheld computer.

Another exemplary embodiment relates to a handheld computer. The handheld computer includes a housing, a display supported by the housing and configured to display images representative of computer program applications, a memory, and a microprocessor coupled to the memory and the display and configured to run applications stored in the memory. The handheld computer also includes a software application stored outside the handheld computer, and a launching application stored in the memory and having an image on the display representative of the software application and the launching application prompting the installation of the software application when the launching application is run by selecting the image representative of the software application and the launching application running the software application after the software application has been installed by selection of the image representative of the software application.

Yet another exemplary embodiment relates to a method of using an e-mail application in a wireless environment. The method includes providing an e-mail application not configured for use over a wireless connection on a handheld computer. The method also includes providing a launching application on a handheld computer, the launching application displaying an icon on the handheld computer representative of the e-mail application. Further the method includes starting the launching application, modifying parameters of the handheld computer, by the launching application, so that the e-mail application is able to use a wireless connection, and running, automatically, the e-mail application.

Yet still another exemplary embodiment relates to a method of using an application on a handheld computer. The method includes providing an application not configured to run in a desired manner on the handheld computer. The method also includes providing a launching application on the handheld computer, the launching application displaying an icon on the handheld computer representative of the application. Further, the method includes starting the launching application, modifying parameters of the handheld computer, by the launching application, so that the application is able to run on the handheld computer, and running, automatically, the application.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
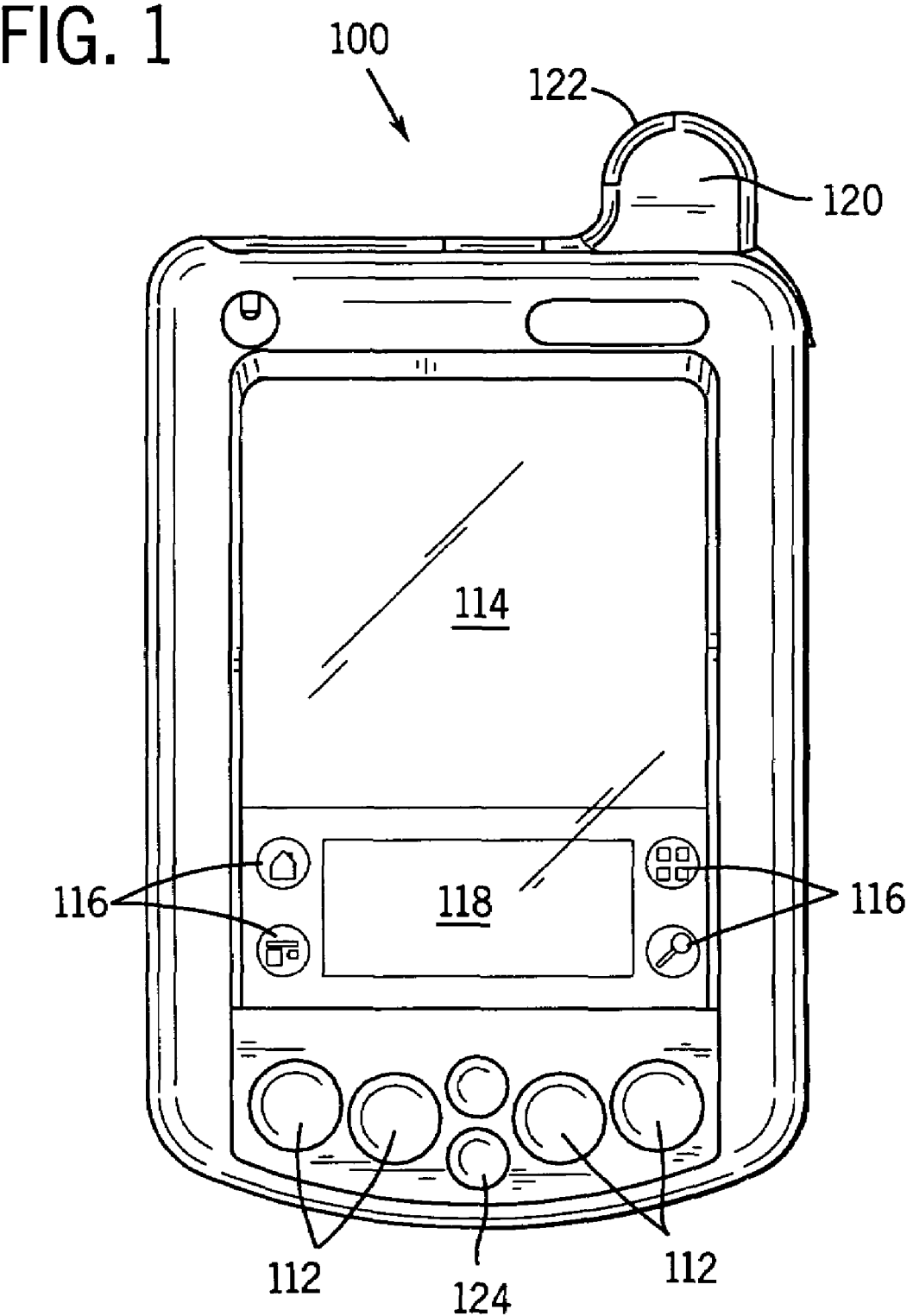
FIG. 1 is an exemplary front elevation view of a handheld computer.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE (or Pocket PC) handheld computers, or other handheld computers and personal digital assistants, as well as mobile telephones, pagers, and other mobile computing devices.

Preferably, handheld computer 100 includes interactive hardware and software that performs functions such as maintaining calendars, phone lists, task lists, note pads, calculator applications, spreadsheets, games, video files, and other applications capable of running on a computing device. Further, handheld computer 100 may be configured for such functions as voice memo recording and playback as well as communications network connectivity, Internet connectivity, wireless messaging, e-mail, always-on e-mail, and wireless telephony.

Handheld computer 100, depicted in FIG. 1, includes a plurality of input function keys 112 and a display 114 having graphical user interface features. Display 114 may be provided with a touch screen interface that allows a user to select and alter displayed content using a pointer, such as but not limited to a stylus, a pen tip, a fingertip, or other pointing devices.

Referring again to FIG. 1, in an exemplary embodiment, display 114 also includes a Graffiti™ (or other handwriting recognition software) writing section 118 for tracing alphanumeric characters as input. A plurality of input icons 116 for performing automated or preprogrammed functions may be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communications signals using an RF transceiver. Antenna 120 may further include an indicator light 122 integrated into antenna 120 for indicating the transmission and reception of wireless communication signals. Further, light 122 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, etc.

Some software applications require modified behavior in order to run on a handheld computer such as handheld computer 100. The software applications may not have been originally designed to run on the type, version or style of handheld computer 100, or under the type, version or style of operating system running on handheld computer 100. Such software applications may also require that hardware settings be modified in order to run on a specific handheld computer 100. Further, many software applications may not be easily modified for the appropriate behavior. Therefore, a software application that provides the necessary functionality for the application to work in a modified manner on the specific handheld computer and that simply launches the software application, is disclosed. In a particular exemplary embodiment, the original software application's launching icon may be hidden from view by a launching application, and the launching application's icon is displayed to the user on a display, the launching application's launching icon preferably resembling the original software application's launching icon, so that the use of the launching application appears seamless to the user or not evident to the user. The launching application forces the modification to take place at run time of the launching application.

In a particular exemplary embodiment, an application is loaded onto a handheld computer. The application requires modified behavior or it will not run properly on the handheld computer. A launching application is loaded onto handheld computer 100. The launching application functions to hide the software application needing modification and displays an icon, which is the same or similar to the application requiring modified behavior, on display 114. Thus, when a user selects the icon of the launching application, the launching application functions to provide the necessary functionality such that the software application will run appropriately on handheld computer 100 and/or will make modifications to the software operating system and/or the hardware parameters of handheld computer 100 so that the software application run appropriately on handheld computer 100.

Figure 2:
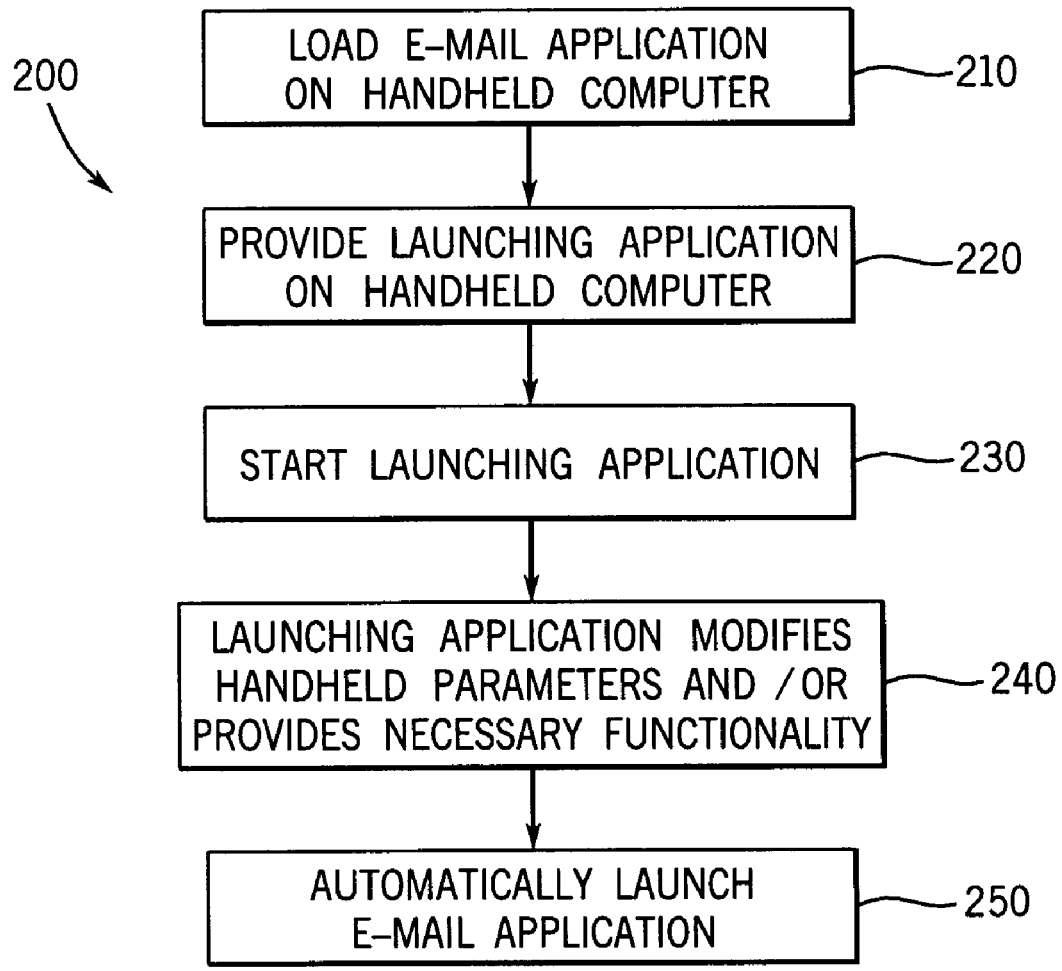
FIG. 2 is an exemplary process diagram for a method of using an e-mail application.

Referring now to FIG. 2, in an exemplary embodiment a process 200 is disclosed for a method of using an e-mail application on handheld computer 100. In exemplary process 200, an e-mail application is loaded onto handheld computer 100 (step 210), handheld computer 100 being configured for wireless connection to an e-mail server via a radio frequency or other wireless transceiver. The e-mail application may, in an exemplary embodiment, have been written for a situation in which wireless connectivity with an e-mail server or a specific type of e-mail server was not enabled. Accordingly, a launching application is provided on handheld computer 100 (step 220). The launching application provides a similar or substantially similar icon as the original e-mail application. Accordingly, a user of the launching application may not even realize that they are running a separate launching application prior to running the e-mail application. Thus, a user selects the launching application icon on handheld computer 100 which starts the launching application (step 230). The launching application modifies the handheld parameters and/or provides the necessary functionality needed by the e-mail application to work in a wireless environment that the e-mail application was not originally designed to work in (step 240). Once the necessary functionality has been provided and/or the parameters necessary for the e-mail application to function properly have been modified, the launching application automatically launches the e-mail application (step 250). Once the e-mail application has been launched by the launching application, it is then capable of functioning in the wireless environment that it was not originally designed to function in.

In another exemplary embodiment, it may be desired to make a web clipping application (or any other type of application) a hard-coded button default in the operating system, functioning on handheld computer 100. Certain operating systems may not allow a hard-coded button for a web clipping application. Accordingly, a launching application may be used which substitutes a small launching application having the same icon as the original web clipping application and hides the original web clipping application icon from view. The launching application icon is then selected by a user and automatically launches the web clipping application. Therefore, the inability of the operating system to allow certain types of applications is overcome or circumvented by the use of the launching application.

In another exemplary embodiment, it may be desired to pre-load a large application such as but not limited to a large browser application on handheld computer 100 prior to shipping handheld computer 100. However, the large application may not fit into the device's flash read-only memory (ROM) storage area. The application may then only be shipped on another storage medium, such as but not limited to a compact disc because the device is shipped in a no power configuration. Accordingly, the large application may not be able to be shown as a pre-loaded application. Utilizing a small launching application which has the icon representative of the larger application such as the large browser application may be used and stored in flash ROM such that when run, the launching application prompts the user to install the real application or the larger browser application from the CD or other storage medium. Once the large browser application is loaded into the operating system random access memory (RAM) storage, selection of the launching icon will then start the large browser application instead of prompting for installation of the application. Further, should the large application later become deleted from RAM, by resetting or complete power down, selection of the launching icon may again prompt installation of the large application.

Figure 3:
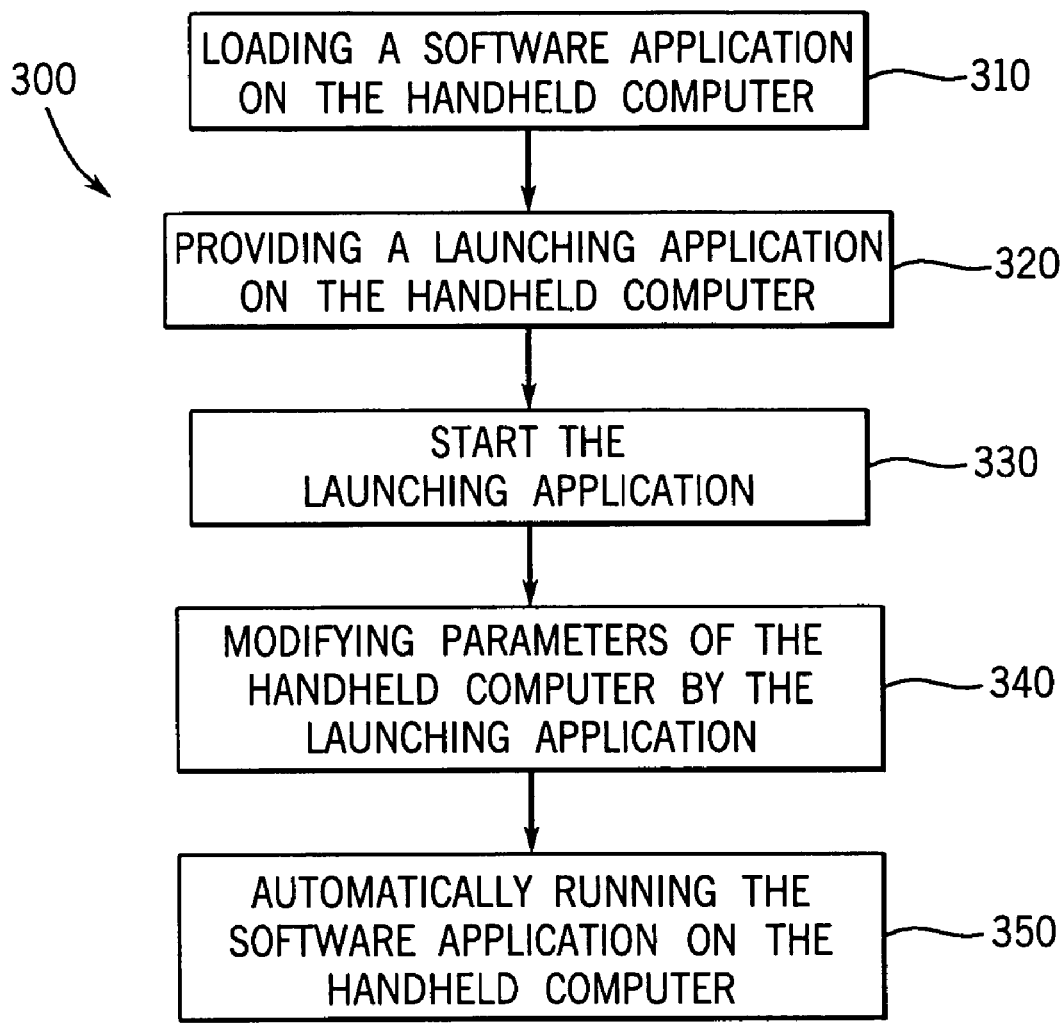
FIG. 3 is an exemplary process diagram for a method of using a software application on a handheld computer.

Referring now to FIG. 3, a process 300 is depicted for a method of using a software application on a handheld computer. A software application is first loaded onto the handheld computer (step 310). In an exemplary embodiment, the software application was not designed to function with the type of handheld computer 100 on which it is being used, and/or with certain types of peripheral devices and/or displays, and/or with the operating system type or version being used, etc. Accordingly, a launching application is provided on handheld computer 100 (step 320). The launching application is started by a user which may, in a particularly preferred embodiment, see an icon that is the same as or similar to the software application which is eventually to be run. The user selects the icon of the launching application which starts the launching application (step 330). Parameters of the handheld computer or functionality needed by the software application is provided by the launching application (step 340). Once the proper or needed functionality is provided or the proper parameters have been set, the software application is then automatically run by the launching application on handheld computer 100 (step 350).

The embodiments discussed above and other embodiments which fit within the scope of the invention as expressed in the claims may be designed to provide seamless operation of a launching application that is adapted to provide modified behavior of a software application and/or of the handheld computer such that the software application runs appropriately on handheld computer 100 even in the situation in which the software application was not designed to be used with handheld computer 100 and/or the configuration of handheld computer 100.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of using an e-mail application in a wireless environment, comprising:
   providing an e-mail application not configured for use over a wireless connection on a handheld computer;
   providing a launching application on a handheld computer, the launching application displaying an icon on the handheld computer representative of the e-mail application;
   starting the launching application;
   modifying parameters of the handheld computer, by the launching application, so that the e-mail application is able to use a wireless connection; and
   running, automatically, the e-mail application.

2. The method of claim 1, further comprising: connecting wirelessly to an e-mail server.

3. The method of claim 2, further comprising:
   sending an e-mail to the e-mail server.

4. The method of claim 1, wherein the handheld computer includes a radio frequency transceiver.

5. The method of claim 1, wherein the launching application is started by selecting the icon representative of the e-mail application.

6. A method of using an application on a handheld computer, comprising:
   providing an application not configured to run on the handheld computer;
   providing a launching application on the handheld computer, the launching application displaying an icon on the handheld computer representative of the application;
   starting the launching application;
   modifying parameters of the handheld computer, by the launching application, so that the application is able to run on the handheld computer; and
   running, automatically, the application.

7. The method of claim 6, wherein the application is a web clipping application.

8. The method of claim 6, wherein the modifications to the parameters of the handheld computer includes removing operating system incompatibilities with the software application.

9. The method of claim 6, wherein the modifications to the parameters of the handheld computer includes removing hardware incompatibilities with the software application.

10. The method of claim 6, wherein the modifications to the parameters of the handheld computer includes removing display incompatibilities with the software application.

11. The method of claim 6, further comprising selecting the icon of the launching application.

* * * * *